A. L. BAUSMAN.
CHOCOLATE COATING MACHINE OR THE LIKE.
APPLICATION FILED JULY 24, 1917.

1,323,948.

Patented Dec. 2, 1919.
3 SHEETS—SHEET 1.

INVENTOR.
Alonzo L. Bausman,
BY Chapin + Neal
ATTORNEYS.

WITNESSES:

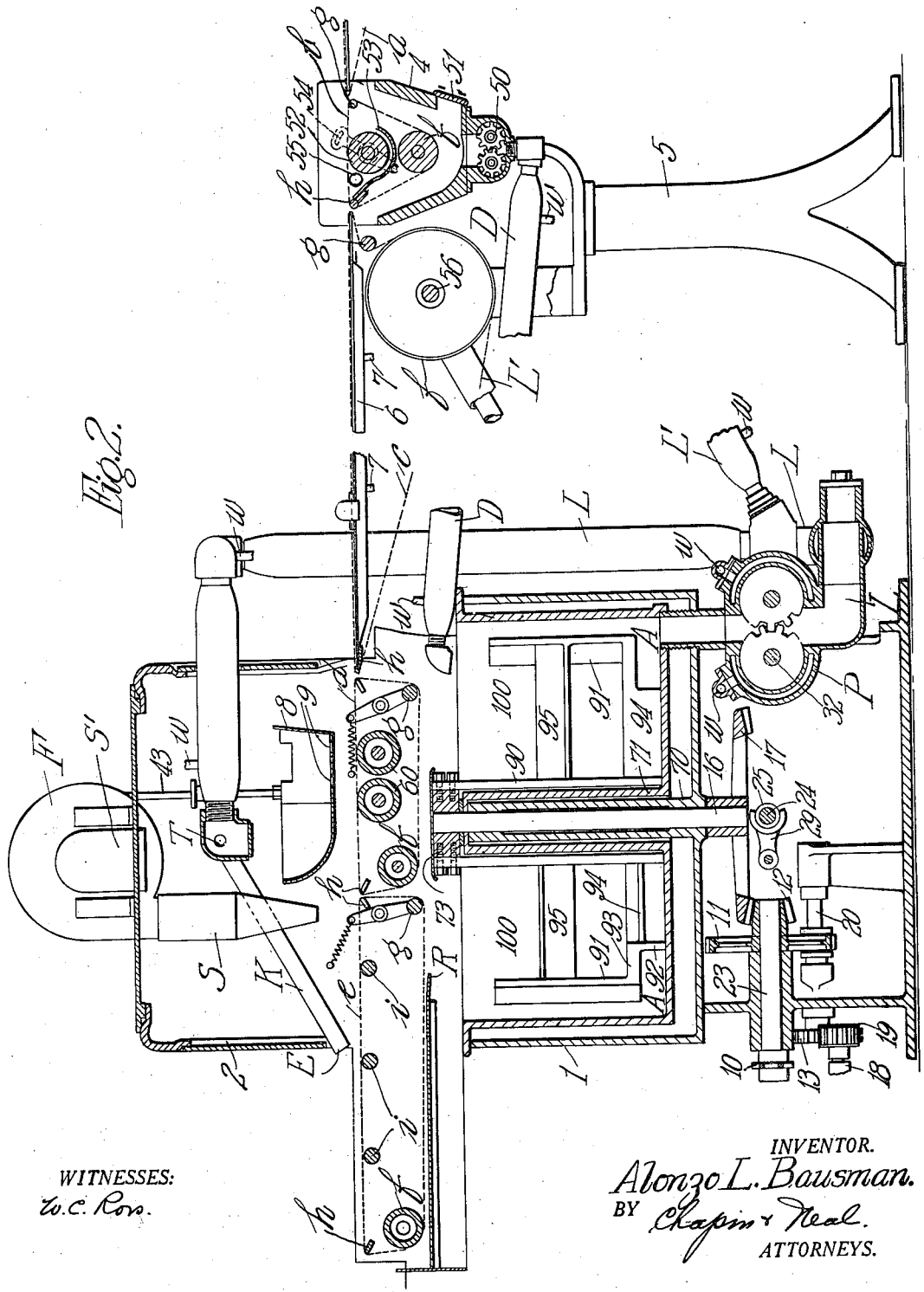

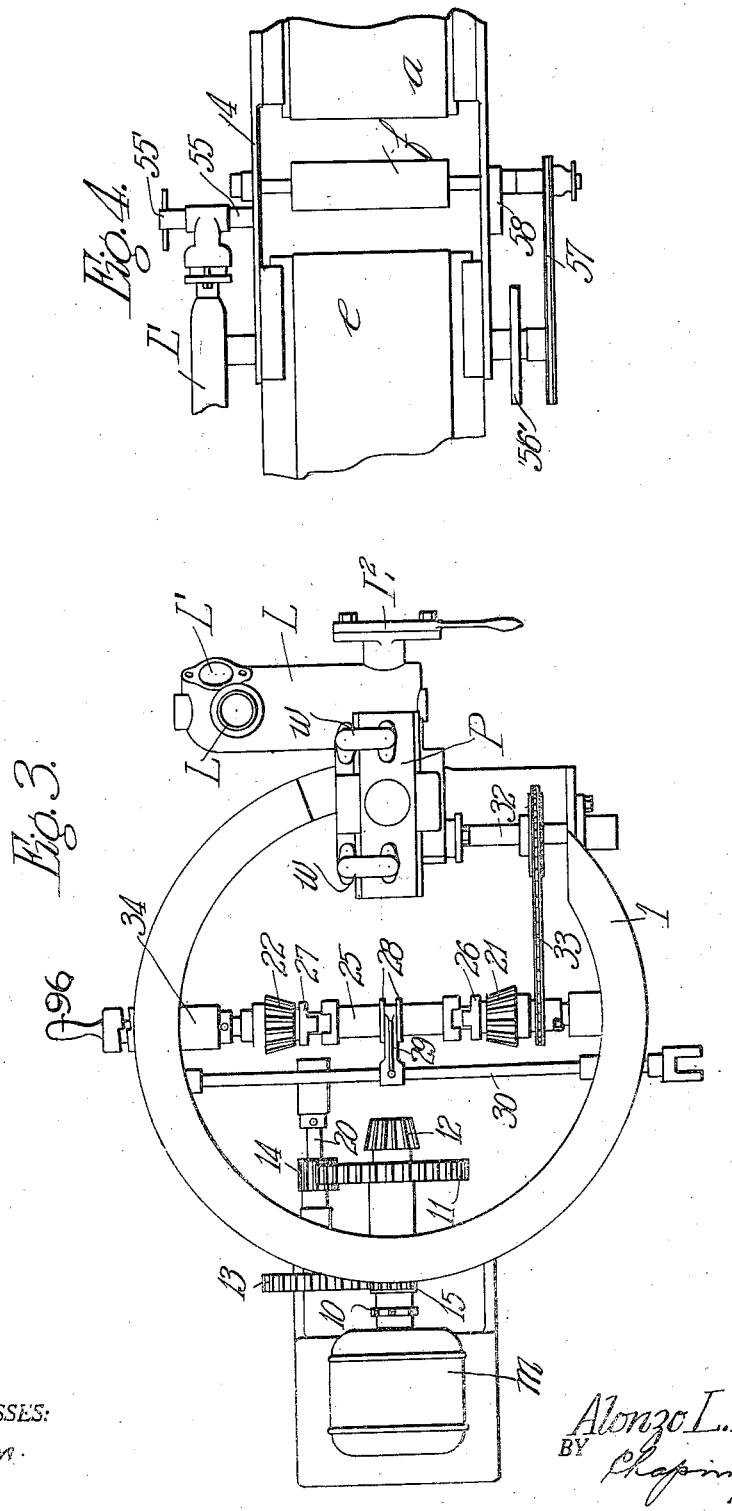

UNITED STATES PATENT OFFICE.

ALONZO LINTON BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

CHOCOLATE-COATING MACHINE OR THE LIKE.

1,323,948.            Specification of Letters Patent.        Patented Dec. 2, 1919.

Application filed July 24, 1917. Serial No. 182,419.

*To all whom it may concern:*

Be it known that I, ALONZO LINTON BAUSMAN, a citizen of the United States of America, residing at Chicopee, in the county of Hampden and State of Massachusetts, have invented certain new and useful Improvements in Chocolate-Coating Machines or the like, of which the following is a specification.

This invention is directed to improvements in confectionery coating machines and particularly to chocolate coating machines. The product treated in machines of this character is valuable. The machines turn out many hundreds of pounds of goods per day and the quality of the work is of prime importance. The operation of the machines not only affects the quality of the product in appearance such as structure, color, and gloss, but also the actual quality of the confections and more particularly the quality of the chocolate coating with respect to its homogeneity, smoothness, and intrinsic tasteful qualities. The present invention, therefore, is concerned with improvements in automatic coating machines, by which improvements the quality of the goods coated may be uniformly maintained at a high standard and a better product may be made from a given quality of material than by a like machine without the improvements.

A commonly used automatic coating machine embodies a system of conveyers arranged in line to feed the goods from one conveyer to another through different steps and operations. One of the conveyers is contained within a substantially closed casing, maintained at a constant temperature, and as the goods travel along this conveyer they meet a descending stream or streams of plastic chocolate (preferably at a temperature just above the freezing point for chocolate) which covers the goods. The excess chocolate passes through the open work conveyer into a main supply tank. From this tank, the chocolate in comparatively small volume is elevated above the coating conveyer and released to form the shower. Thus the chocolate travels in a continuous cycle, some of it used to coat the goods first, and the rest to return to the tank and be elevated for a subsequent coating. In this cycle of movement of the chocolate as described, it is stirred up to a considerable degree. When the excess chocolate returns to the main supply tank it has absorbed a certain amount of air. The chocolate in the main tank therefore becomes full of air bubbles after it has been circulated a few hours. Consequently, these minute bubbles necessarily appear in the coating chocolate thereafter applied to the goods. The quality of the coated goods, therefore, changes because the chocolate is not homogeneous. The air in the chocolate also makes it take a lighter color. This is a disadvantage for the reason that the trade consider the dark colored chocolate as of higher grade. In the use of the prior machines, a chocolate of a really good grade takes on the appearance of a poorer grade due to the air absorbed by the chocolate. Furthermore, the presence of the air in the chocolate of the finished goods makes its taste less agreeable, does not so effectively seal the goods against the access of air, causing the pieces to age quickly and prevents the formation of the dark glossy appearance desired particularly in coated candies.

According to one feature of my invention, I provide means for separating the air from the chocolate after it reaches the main supply tank and before it again goes through the path to meet the goods. Thus the chocolate elevated from the tank to be applied to the goods is homogeneous and generally free from air. I prefer to embody this feature in the form of a novel combination of stirring device and chocolate elevating means. The stirring device rotates in the main tank and the blades are arranged to work the chocolate from the bottom slowly to the top over and over. The chocolate at the top releases its pocketed air bubbles and then gradually sinks by gravity alone. By this slow stirring the air is released and the chocolate at the bottom of the tank is at the right temperature for coating and also homogeneous. I connect an elevating means, such as a rotary pump, with the bottom of the tank and the stream forming device above the conveyer. The chocolate, therefore, starts on its cycle of movement when it is in the best condition both as to temperature and quality, for application as a coating. The coating is then uniformly applied as a homogeneous plastic by my invention rather than as a beaten up mixture of chocolate and air.

It is highly desirable in a coating machine of the general kind described to keep the chocolate in the main supply tank during the periods when the machine is idle as during the night. When the machine is started, the mass of chocolate in the tank may be readily heated to the desired temperature. It may then be sent through the machine for its function with the best results and least delay. To accomplish this I provide means to reverse the rotary pump feeding means whereby that chocolate in the system which is on its path to coat the goods may be pumped back to the main supply tank when the coating operations are stopped. When the machine is again ready to start, the chocolate for the first as well as subsequent coatings must come from the bottom of the main tank where it is necessarily in the best condition for its purpose. This arrangement constitutes another feature of my invention.

In coating goods of high quality a device known as a bottoming attachment is used. This device operates to coat the bottom of the goods traveling on the conveyers with an extra layer of chocolate prior to the time at which the main coating is applied. The best practice has been to apply the extra bottom coating first, then chill this coating before applying the main coating. This chilling of the preliminary bottom coating permits the adhesion of more chocolate to the bottom during the main coating operation. This method permits the formation of an extra heavy bottom coating. To carry out the method in an automatic machine of the type above mentioned necessitates the location of the bottoming device at a distance from the main body of the machine and the insertion of a conveyer adjacent chilling means between the bottoming attachment and the main coating apparatus. The remoteness of the bottoming attachment in the manner stated has caused very real difficulties particularly in controlling the temperature and the quality of the chocolate of the preliminary bottom coating. This quality should be the same as the other coating. Heretofore such has not been the case, due to the difference in the manner of handling the chocolate. For this reason, I have provided means for unifying the temperature and the quality of chocolate as applied by the bottoming attachment (even though remote) with the quality of chocolate applied on the main coating conveyer whereby the completed coatings will be of one high quality. This means or its equivalent forms an important feature of my invention.

Other features of the invention will appear from the detailed description of one preferred embodiment of the invention and accompanying drawings used for illustrative purposes and then be pointed out and defined in the annexed claims.

In the accompanying drawings:

Fig. 2 is a longitudinal sectional view of the main coating machine, the bottoming attachment, and the various conveyers on which the goods travel in the coating operation as a whole;

Fig. 3 is a section on line 3—3 of Fig. 1 with parts removed; and

Fig. 4 is a top plan view of the bottoming attachment with parts removed.

Figure 1:
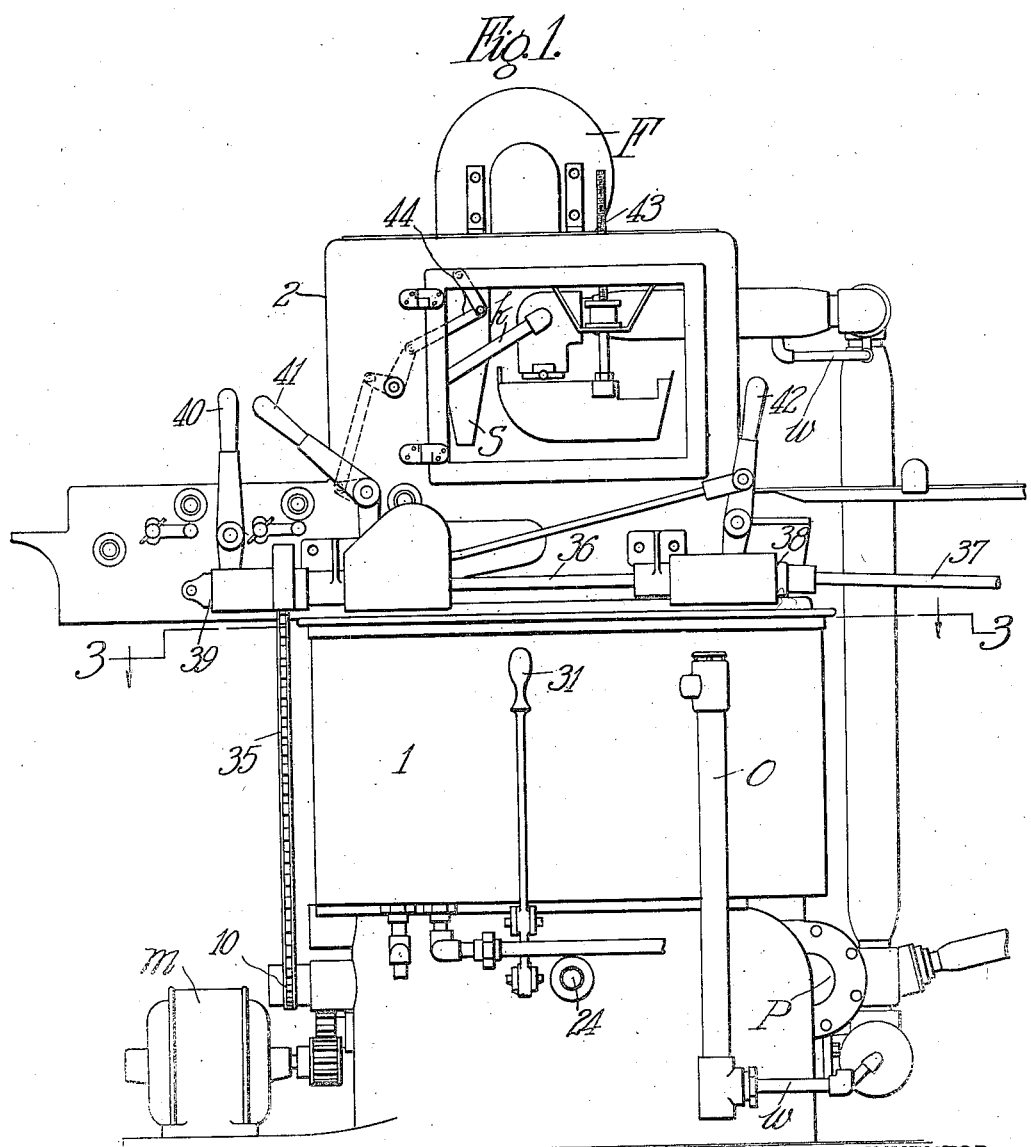
Fig. 1 is a side view of the main coating machine with a portion of the conveyer leading to it.

In the various figures certain parts are omitted which are unnecessary to a clear understanding of the various features of the invention.

The main body of the machine is shown in Figs. 1 and 2. It consists of a jacketed chocolate tank 1 resting on a hollow pedestal inclosing a portion of the driving mechanism. Resting on the top of the tank 1 is a temperature maintaining casing 2. The interior of the casing and its extension is heated by any suitable automatically controlled means so that together with the jacketed tank 1 the chocolate in the main machine may be kept at approximately one temperature, that one temperature best for coating purposes.

The conveyers for carrying the goods through the coating operations are best indicated in Fig. 2. Conveyers $a$, $b$, $c$, $d$, and $e$ are arranged in line to feed automatically from one to the other in the order named. The manner of constructing, supporting, driving, and tensioning these conveyers is well understood in the art or sufficiently indicated in the drawings, and only the briefest mention of these parts will be made in this description. Conveyer $b$ is mounted to travel in the bottoming tank 4 carried by the stand 5 and is made of open wire or skeleton work so that the chocolate can easily pass through it from below to coat the bottom of the goods. The conveyer $c$ in its top flight passes over a closed shallow pan 6 of substantially equal dimensions with the top flight and cold water or other cooling medium is circulated in the pan by means of inlet and outlet pipes 7, whereby the bottom coatings of the goods on conveyer $c$ are chilled before they pass onto conveyer $d$. Conveyer $d$ is necessarily like conveyer $b$ in construction so that the chocolate from the chocolate flow pan 8 (supported from casing 2) emitted through slots 9 may coat the goods and at the same time pass through the conveyer back to tank 1. The rotating rolls 60 work the chocolate from slots 9 against the bottom of the goods to apply the main bottom coating in the usual manner. The driving rolls of the conveyers are indicated generally by character $f$, tension means by $g$, the guide rods by $h$, and the supporting rods by $i$. All these parts are well known and are suitably supported at their ends in casing 2, tank 4, standard 5, all as indicated or by other suitable means The driving means for the machine will now be described. Referring to Figs. 2 and 3, the motor $m$ drives the shaft 16 by the following intermediate speed reducing gear train, shaft 18, gears 19 and 13, shaft 20, gears 14, 11, shaft 23, gear 12, and gear 17. It is clear that shaft 16 will operate at a greatly reduced speed. A sprocket 10 is fixed to shaft 23 for connection with the conveyer and other driving means to be described. The cross shaft 24 extends at right angles under shaft 16. Loose on this shaft 24 are bevel gears 21 and 22 in constant mesh at diametrically opposite points with gear 17. The bevel gears are held in position by suitable collars, as indicated, and are each connected to drive its clutch elements 26 and 27, respectively. Intermediate these clutch elements 26 and 27, a sleeve 25, with opposed clutch elements on the ends thereof, is feathered to shaft 24. The sleeve is moved to engage clutch element 26 or clutch element 27 by means of flanges 28 and a forked member 29 fixed on the rod 30 which latter is slidably mounted in the pedestal to be operated by hand lever 31 (see Fig. 1). By this arrangement of structure shaft 24 may be driven in either direction from gear 17 through gears 21 and 22. The shaft 24 is the power shaft for the pump.

The rotary pump shaft 32 is connected to shaft 24 by chain and sprocket 33 so that on account of shaft 24 and its driving connections, as above described, the pump may be operated in either direction. The hand crank 96 is slidably mounted on shaft 24 with a clutch element to drive sleeve 34 and the shaft by hand when desired. The shaft 32 has one of the gears of a rotary pump keyed thereto. The pump is indicated generally by character P and is preferably of the same kind as shown and described in my copending application Serial No. 182,420 filed July 24, 1917, although any pump found suitable for pumping chocolate may be used in its place.

The sprocket 10 on shaft 23 is connected by chain 35 to a sprocket on shaft 36. The latter, together with shafts such as 37 connected by universal joint elements as 38 and 39, are adapted by driving connections not shown to drive the various conveyers $a$, $b$, $c$, $d$, and $e$, and other mechanism which may be associated therewith, as the plaque delivery system and the bottoming attachment.

The levers 40, 41, and 42 are provided to operate desirable clutches in the driving connections, whereby the conveyers and associated mechanism may operate alone or in unison. Levers 41 and 42 are shown connected together, whereby the operation of one insures the operation of the other for a purpose to be described. The particular driving connections at this point do not form a material part of the invention except that they are independent of the pump operating means in the sense that the drive of the latter may be reversed in direction without reversing the driven parts of the rest of the machine.

The flow pan 8 is of well known construction, adjustably supported from the top of casing 2 by two spaced rods 43, one only of which is shown. The fan F is preferably driven by a separate motor and the force of the blast from spout S may be regulated by a suitable damper (not shown) as desired. The air for the fan is drawn through connections S', one arranged on each side of the fan to communicate with the warm air within casing 2. The spout S may be moved to and away from belt $e$ by suitable adjusting means, whereby the air may be applied to blow-off part of the coatings, as desired. The belt $d$ and the belts feeding goods to belt $d$ are driven through suitable driving connections with the driving shafts 36 and 37 arranged along the side of the machine (see Fig. 1). The shaft 36 connected through chain 35 with motor $m$ rotates all the time and a suitable driving connection therewith drives belt $d$. In this driving connection there is a clutch (not shown) operated by bell crank lever 41 to stop and start the movement of belt $d$. The shaft 37 is connected to shaft 36 through a clutch (not shown) operated by lever 42. The feeding means to belt $d$ are all driven from shaft 37. The levers 41 and 42 are connected to operate together so that if belt $d$ is stopped the feeding means leading thereto is stopped for otherwise the goods would pile up on conveyer $d$. When conveyer $d$ is stopped for any reason with freshly coated goods thereon, it is desirable to shut off the flow of air from spout S, otherwise the chocolate on the goods lying still under the spout S would be largely blown off to the detriment of the quality of coatings. Therefore, a system of links indicated at 44, Fig. 1, connects a damper in the outlet passage of fan F with lever 41 so that, when the latter is moved to stop belt $d$, the damper is moved to close the outlet passage from the fan F.

The bottoming attachment will now be described. This is best seen in Fig. 2 and is shown in plan with parts removed in Fig. 4. It comprises as shown a tank 4 open at the top with a rotary pump 50 at the bottom and a door 51 for cleaning purposes. The bottoming belt $b$ is driven by roll $f$ and guided in its top flight by rods $g$ and $h$. A bottoming roll 52 extends under and across the belt *b*. A pan 53 open at the ends is curved around the lower travel of roll 52 to form a chocolate trough. This pan is adjustably supported on a cross-bar in tank 4, as indicated, and its outer upper edge may be moved toward and away from roll 52 by means of the pivoted adjusting lever 54 to which the pan is attached. The chocolate enters through pipe 55 (controlled by valve 55') extending to about the middle of the pan or trough. It fills the space between the trough and roll 52 and then overflows at the ends and edge into the tank 4. The rotary pump 50 operates to keep the tank 4 practically empty as will be later described. The roll 52 and roll *f* are rotated counterclockwise, and the pump 50 is rotated to empty tank 4. These parts may be driven from shaft 56 which is connected in any suitable driving manner with the drive connection 37 (Fig. 1) and may be turned by hand wheel 56' when desired. The driving connection may be by chain 57 to the shaft of roll *f* and from the latter shaft by gears in casing 58 to pump 50 and by any other suitable gearing not shown to roll 52.

The adjustment of the pan or trough 53 determines the amount or thickness of chocolate picked up by roll 52 and applied to the bottom of the goods on belt *b*. The goods coated on the bottoms in the desired manner travel automatically to and on belt *c* above cooling pan 6. The latter chills the bottom coatings before the goods arrive on belt *d*. Thus the main coatings applied on belt *d* are applied after the preliminary bottom coating is securely chilled. The bottoming rolls 60 driven from shaft 36 are usual devices used to apply the bottom coatings to goods on belt *d*, either when the remote bottoming attachment is used or is not used. The preliminary bottom coating, since it is chilled, enables the second bottom coating to be applied as a second layer. When the two bottom coatings are thus applied, a satisfactory heavy bottom coating is obtained which is most desirable on the goods of high quality.

The conveying means, as jacketed pipes for conveying the chocolate from the rotary pump P to flow pan 8 and through pipe 55 to trough 53, are indicated by L and L', respectively. A gate valve L² at the bottom level of pipe L (see Fig. 3) may be used together with gate 51 to empty the entire system when desired. It is to be particularly noted that these pipes supply the chocolate for all coating operations from the bottom of tank 1 where, as will later appear, the chocolate is of the best quality for coating, because of the conditioning means associated with the tank 1; that is to say, the means consisting of the superior temperature control system, the stirrer and its action to make the quality of chocolate uniform and free from air. Thus, if these pipes L and L' are emptied by reversing the rotation of pump P at the end of the coating operations, the chocolate will be on subsequent coating operations of the one improved uniform and desired grade determined by the conditions surrounding the main tank 1. If the chocolate were left in pipes L and L' between coating operations, the machine would not be ready to coat again so quickly for time would be taken up in getting the chocolate in pipes L and L' back to tank 1 and conditioned for use or the first coatings applied would be of poorer grade than those subsequently applied after the machine had operated awhile under normal conditions.

The tank 4 is emptied by rotary pump 50 driving chocolate through pipe D back to the top of the mass in tank 1. Pipes L, L', and D are jacketed substantially their whole length, as indicated, and a circulation of temperature controlling medium, such as steam or hot or cold water maintained in the jacket spaces of these pipes as well as the jacket spaces of pump P which spaces are preferably all connected to a single temperature controlling system, the piping of which is indicated by *w* and the stand pipe or overflow by *o*. It is considered unnecessary to describe this system in detail for any heating engineer can supply the detail from a known art with the requirements indicated herein taken together with the drawings.

The pipe L ends in a downwardly directed spout arranged above flow pan 8. From this spout similar pipes K connected as at T extend transversely and then backwardly so that they open outside of the casing 2 along each side of and adjacent belt *e*. The pressure in pipe L is sufficient to keep chocolate flowing through pipes *k* to points E one on each side of the belt. At this point, operators may stand and with fingers, or hand instruments, intermittently dipped in the chocolate from the pipes, cause strings to fall onto the coated goods in various configurations as desired for decorations. This chocolate will be of the same quality as the coating on all the sides. Arranged below the pipes E and below belt *e*, there is a drain pan R which leads the chocolate back to the top of tank 1.

The stirrer 100 is fixed to the top of shaft 16 as indicated. The shaft extends through and has a bearing within the concentric tubular extensions 70 and 71 rising from the center of the double walled tank 1. That part 73 attached to the top of shaft 16 and the stirrer may rest on the top of such tubular extensions for a bearing. The stirrer 100 is constructed for particular and special action on the chocolate in tank 1 to separate and free the air in the chocolate. As shown, it may consist of a hub 90; vertical plates 91 arranged at a plowing angle to and adjacent the walls of the tank 1; the vertical walls 92 offset toward the center and adjacent the bottom of the tank and connected with bottoms of plates 91 by horizontal webs 93; the stirring blades 95 between the hub 90 and plates 91; and stirring blades 94 between the hub and walls 92. The stirring blades 95 and 94 are tipped downwardly in the direction of their rotation. Blades 94 extend from the hub a distance substantially less than the radius of the tank while the blades 95 above 94 extend from the hub to and merge with plates or blades 91 to form therewith stirring plows. By the described construction, the blades and plates in contact with the chocolate move the latter around and up in the tank. The only force acting to move the chocolate down in the tank is gravity alone. An annular space A undisturbed by the blades described may be effectively provided, as shown at the bottom of the tank and the inlet of the pump P connected with this space. By the construction of stirrer described, it will be seen that the chocolate, after it has completed each cycle of movement and is emptied into tank 1 at the top, is acted upon by the blades to carry it around and keep it at the top where it will release its pocketed air. Gravity alone causes it to finally and very slowly descend against the action of the blades until it reaches space A where, being by this time freed from air and thoroughly conditioned for coating, it is drawn into pump P and again forced to the point where part of it is applied as a coating either by the bottoming attachment, the flow pan, or the operators at points E. Thus, wherever used, the chocolate is conditioned for one uniform high grade coating. The fact that the grade of the coating chocolate is determined by the method of manipulating it in the machine as well as by its original character makes the operation analogous to cooking. Therefore, the advantages of the invention in one aspect may be compared to the advantages of improving the quality of products by cooking in the best manner wherein given materials for the original ingredients are used to their full possibilities.

As I pointed out at the beginning of this specification, the more important features of my invention relate to the improvement in the uniform quality of the product of the machine rather than to the mechanical construction of the machine for improvements in mechanical operations *per se.* I, therefore, desire to emphasize the fact that such features of my invention can be, after this disclosure, readily adapted to various known types of coating machines differing from the one shown. Likewise detail changes can be readily made in the specific structure described herein.

The structure has been described as a preferred form to comply with the statutes, but the invention is defined in the claims.

What I claim is—

1. A chocolate coating machine or the like, comprising a conveyer, a supply tank for the coating material, means to draw such material from the tank and cause it to flow over the goods on the conveyer, means for conducting the excess of coating material from the conveyer back to the tank, and means acting on the material in the tank to free it from air bubbles before it is again drawn to the flowing means.

2. A chocolate coating machine or the like, comprising a conveyer, a supply tank for the coating material, a pump for withdrawing the material from the tank, a flow pan above the conveyer, means for conveying the excess coating material back to the tank, and a stirrer in the tank serving to agitate the material in the tank and prevent the excess returned from the flow pan settling until it is freed from air bubbles.

3. A chocolate coating machine or the like including a horizontal conveyer belt of skeleton construction for the goods to be coated, a flow pan above and a main chocolate supply tank below the belt, means to free the chocolate from air-bubbles and in the character of a stirrer having means to turn it slowly through the mass of chocolate in the tank, the blades on the stirrer being arranged to gradually and continuously lift the chocolate from the bottom to the top of the tank, a pump connected to the bottom of the tank to force chocolate to the flow pan, all constructed and arranged to free the air picked up by the chocolate in passing from the flow pan back to the tank and cause the chocolate to retain one uniform condition for coating.

4. A chocolate coating machine or the like including a main supply tank, means to hold the goods for coating, means to convey chocolate from the tank to the goods on the holding means, means to attain and maintain a constant temperature for the chocolate in the main tank suitable for coating, means to free the chocolate from air bubbles, and operable to stir the chocolate in the main tank to improve its condition for coating, a pump and driving means therefor operable to force the chocolate from the tank through the conveying means to the goods or to draw the chocolate from the conveying means to the tank, whereby upon first starting the machine as well as after it is started, the chocolate for coating may always be of a quality and condition determined by the tank, its heating means, and stirring means.

5. In a chocolate coating machine or the like, a main supply tank for the coating material, means to take material from and return it to the tank as desired, means to free the chocolate from air bubbles thereby to condition the material for coating, such means including a device operable to tend to keep the material at the top of the tank, whereby it may sink by gravity alone after it has had repeated opportunities to break up air bubbles at the top and a conduit at the bottom of the tank leading to such first-mentioned means.

6. In a chocolate coating machine or the like, a main supply tank, means to automatically and successively coat goods at a plurality of points, means to cause circulation of chocolate from the tank to such points in volume relatively small in comparison to the capacity of the tank, and means associated with the tank to free the chocolate from air bubbles thereby to condition the chocolate to one uniform grade for coating operations and maintain such uniformity from the start to the finish of successive workings of the machine.

7. A chocolate coating machine or the like, comprising means for applying a bottom coating to goods, a conveyer receiving the goods from the bottom coating means, cooling means for the goods on said conveyer, means for applying a second bottom coating to the goods after the first coating has cooled, means for coating the tops and sides of the goods, a common supply for the top coating means and the two bottom coating means, and means to lead the excess coating material from all three coating means back to the common supply, whereby the two bottom coatings and the top coating are all of the same quality and condition.

8. In a chocolate coating machine or the like, a main supply tank having means to properly condition the coating material and maintain such condition for continuous coating operations, means to hold the goods for continuous coating operations, a pump having an inlet to the tank at a point where the chocolate is most suitable for coating and pipes to deliver the chocolate therefrom to the goods on the holding means, and driving means to cause the pump to deliver the chocolate for coating or return it from the pipes to the tank when the coating operations have stopped, whereby the chocolate for starting the coating operations again may be kept in the tank to be conditioned in a manner which will cause all coatings applied by the machine to be of one uniform grade.

ALONZO LINTON BAUSMAN.